(12) United States Patent
Moser

(10) Patent No.: US 10,925,799 B2
(45) Date of Patent: Feb. 23, 2021

(54) SUSPENSION DEVICE FOR BALANCING A WEIGHT

(71) Applicant: Hocoma AG, Volketswil (CH)

(72) Inventor: Adrian Moser, Zurich (CH)

(73) Assignee: Hocoma AG, Volketswil (CH)

( * ) Notice: Subject to any disclaimer, the term of this patent is extended or adjusted under 35 U.S.C. 154(b) by 95 days.

(21) Appl. No.: 16/084,017

(22) PCT Filed: Mar. 24, 2017

(86) PCT No.: PCT/EP2017/057077
§ 371 (c)(1),
(2) Date: Sep. 11, 2018

(87) PCT Pub. No.: WO2017/162856
PCT Pub. Date: Sep. 28, 2017

(65) Prior Publication Data
US 2019/0336384 A1     Nov. 7, 2019

(30) Foreign Application Priority Data
Mar. 24, 2016   (EP) ..................... 16162444

(51) Int. Cl.
*A61H 3/00*   (2006.01)
*B25J 19/00*  (2006.01)

(52) U.S. Cl.
CPC .......... *A61H 3/008* (2013.01); *B25J 19/0016* (2013.01); *A61H 2201/0192* (2013.01); *A61H 2201/1652* (2013.01)

(58) Field of Classification Search
CPC ................. A61H 3/008; A61H 1/0229; A61H 2201/0192; A61H 2201/1652; A61H 2203/0481; B25J 19/0016; F16M 2200/022; F16M 11/048; F16M 11/24; F16M 11/42; F16M 13/04; F16M 2200/044;
(Continued)

(56) References Cited

U.S. PATENT DOCUMENTS 2,293,437 A    8/1942   La Coste et al.
3,694,829 A *  10/1972  Bakker ............... A61G 7/1017
                                                      5/87.1
4,863,161 A    9/1989   Telle
(Continued)

FOREIGN PATENT DOCUMENTS

CN    1204938 C    6/2005
EP    1908442 A1   4/2008
(Continued)

*Primary Examiner* — Nyca T Nguyen
(74) *Attorney, Agent, or Firm* — The Webb Law Firm

(57) ABSTRACT

A suspension device for balancing a weight, especially a suspension device allowing a patient or a limb of a patient to be at least partially supported in a predetermined direction, includes a frame, a direction guide for the supportive movement, a lever for pivotal connection between the direction guide and the frame around a first axis and at least one spring assembly connecting the lever with the frame. The lever has a second pivotal axis in a distance from the connection between the first pivotal axis and the attachment of the direction guide. The at least one spring assembly is pivotally attached between that second pivotal axis and a fourth pivotal axis connected with the frame.

17 Claims, 8 Drawing Sheets

(58) Field of Classification Search
CPC .............. A63B 69/0064; A63B 21/023; A63B 21/0407; A63B 21/00181
See application file for complete search history.

(56) References Cited

U.S. PATENT DOCUMENTS

| | | | | |
|---|---|---|---|---|
| 4,883,249 | A * | 11/1989 | Garland | B25J 19/0016 248/566 |
| 4,907,571 | A * | 3/1990 | Futakami | A61H 3/008 482/69 |
| 5,190,507 | A * | 3/1993 | Iijima | A61H 3/008 482/69 |
| 5,372,561 | A | 12/1994 | Lynch | |
| 5,746,404 | A * | 5/1998 | Merko | F16M 11/08 248/123.11 |
| 6,199,649 | B1 * | 3/2001 | Alanko | B62B 13/08 180/186 |
| 6,273,844 | B1 | 8/2001 | Kelsey et al. | |
| 7,004,454 | B2 * | 2/2006 | Petrone | B66F 7/0625 254/10 B |
| 7,354,382 | B1 * | 4/2008 | Warren, II | A61G 7/1017 482/68 |
| 7,374,515 | B2 | 5/2008 | Slawinski et al. | |
| 8,152,699 | B1 * | 4/2012 | Ma | A61H 1/0229 482/54 |
| 9,228,917 | B1 * | 1/2016 | Ma | G01M 1/02 |
| 9,903,526 | B2 * | 2/2018 | Roberts | A47B 51/00 |
| 9,987,511 | B2 * | 6/2018 | Bucher | A61H 3/008 |
| 10,018,298 | B2 * | 7/2018 | Goldish | B60B 33/0092 |
| 2002/0157617 | A1 * | 10/2002 | Reinkensmeyer | A01K 15/027 119/728 |
| 2003/0023195 | A1 | 1/2003 | Rahman et al. | |
| 2006/0258495 | A1 * | 11/2006 | Hein | F16M 11/2014 474/82 |
| 2007/0001076 | A1 * | 1/2007 | Asamarai | F16M 11/10 248/281.11 |
| 2007/0080275 | A1 * | 4/2007 | Stachowski | A61B 90/50 248/323 |
| 2008/0029661 | A1 * | 2/2008 | Chen | F16M 11/105 248/176.1 |
| 2009/0215588 | A1 * | 8/2009 | Riener | A61H 1/0237 482/7 |
| 2011/0260017 | A1 * | 10/2011 | Monsalve | F16M 11/2014 248/201 |
| 2012/0000496 | A1 * | 1/2012 | Razon | A61H 3/04 135/67 |
| 2012/0046578 | A1 * | 2/2012 | Agrawal | A61H 1/024 601/35 |
| 2012/0138754 | A1 * | 6/2012 | Lim | F16M 11/04 248/74.1 |
| 2012/0223199 | A1 * | 9/2012 | Abri | F16M 11/14 248/280.11 |
| 2014/0263122 | A1 * | 9/2014 | Roberts | A47B 46/005 211/88.01 |
| 2018/0126566 | A1 * | 5/2018 | Briot | F16M 11/08 |

FOREIGN PATENT DOCUMENTS

| | | |
|---|---|---|
| WO | 2007035096 | 3/2007 |
| WO | 2014098571 A1 | 6/2014 |
| WO | 2016005367 A1 | 1/2016 |

* cited by examiner

SUSPENSION DEVICE FOR BALANCING A WEIGHT

CROSS-REFERENCE TO RELATED APPLICATIONS

This application is the United States national phase of International Application No. PCT/EP2017/057077 filed Mar. 24, 2017, and claims priority to European Patent Application No. 16162444.0 filed Mar. 24, 2016, the disclosures of which are hereby incorporated in their entirety by reference.

BACKGROUND OF THE INVENTION

Field of the Invention

The present invention relates to a suspension device for balancing a weight, especially a suspension device allowing a patient or a limb of a patient to be at least partially suspended or supported in a predetermined direction.

Description of Related Art

EP 1 908 442 A1 discloses a suspension device allowing a patient to be at least partially suspended allowing for an approximate constancy of the unloading of the patient who is attached to a rope by using at least two springs or spring systems and a set of ropes and pulleys. Said known mechanism additionally allowed lifting the patient using a winch.

Another body weight support system was disclosed in WO 2016/005367 allowing the patient to be at least partially suspended while performing a walking training. One requirement for the training form mentioned is that the suspension force is adjustable to the patients' needs and essentially constant over a range of naturally occurring vertical movements of the center of mass of the patient, which corresponds to vertical movements of the harness and the harness attachment points, which relates to a dynamic body weight support.

Other mechanisms for balancing a weight are known from e.g. U.S. Pat. No. 4,883,249 A and US 2003/023195 A1. These simple mechanisms use a rotating arm to which the mass is attached in combination with a so called zero free length spring. These prior art mechanism are far more simpler than the above mentioned patient suspending devices but they are connected with a large height of the mechanism and the limited durability of pulleys used.

SUMMARY OF THE INVENTION

Based on this prior art it is an object of the present invention to provide an improved suspension device for balancing a weight, especially providing a suspension device allowing a patient to be at least partially suspended having higher durability and/or smaller size than the simpler prior art devices.

A suspension device according to the invention for balancing a weight, especially a suspension device allowing a patient or a limb of a patient to be at least partially supported in a predetermined direction, comprises a casing, a direction guide for the supportive movement, a lever for pivotal connection between the direction guide and the casing around a first axis and at least one spring assembly connecting the lever with the casing. The lever comprises a second pivotal axis in a distance from the connection between the first pivotal axis and the attachment of the direction guide, wherein the at least one spring assembly is pivotally attached between that second pivotal axis and a fourth pivotal axis connected with the casing.

The device splits the lifting and the dynamic body weight support. Moving the suspension mechanism up and down the vertical columns of the training device using a spindle mechanism (not shown in the drawings) provides the lifting function. The suspension mechanism provides the dynamic body weight support. Furthermore it is preferred to include a safety static body weight support if the patient stumbles and is about to fall during his training. Such a device is a specific suspension device for balancing a weight for the application within a suspension device for a training apparatus allowing a patient to be at least partially suspended and maintained in case of training problems.

The core of the suspension mechanism comprises an arm that can be rotated around an axis and that provides the suspension force at its distal end. The arm is formed in such a way that it contains the mounting for a second axis at a displacement angle relative to the main direction of the arm. A suggested displacement angle is between 50° and 80° and especially between 60° and 75°, between 65° and 73° more preferably around 70°. The first axis is mounted to the housing of the mechanism. Also mounted to the housing is a further mechanism that allows to adjust the suspension force by moving a fourth axis along a linear path which is inclined relative to the direction of the suspension force by the above mentioned displacement angle.

A spring assembly is mounted to second and fourth axes, respectively, in such a way that no force would be exerted if these axes would coincide (effective zero free length spring). This is achieved by using mountings for the springs that extend outwards along the direction between the second and fourth axes. The spring assembly can consist of multiple springs arranged in parallel. So-called zero length springs are known since the 1930ies and were disclosed for a force measuring device e.g. in U.S. Pat. No. 2,293,437 by Lucien La Coste.

The compactness of the mechanism is achieved by placing the spring assembly "underneath" the first axis by choosing a displacement angle such that the first axis goes through the spring assembly.

The mechanism has thus no pulley or other parts that are deformed—therefore less wear and tear parts. All parts are rigid, except for the springs. All movements are rotational with (ball) bearings, except for the adjustment mechanism for the additional fourth axis. This improves durability.

For the use in a gait training apparatus the mechanism has to provide a purely vertical movement for the arm arrangement. This is achieved by an orthogonal set of linear guides to which the end of the rotating arm is attached.

While the embodiment in the drawings does not allow the suspension force at the end of the arm be zero, because the first and fourth axis cannot completely coincide, effective zero suspension is possible because the linear guides at the vertical guiding rail have non-zero weight—which is compensated by the suspension mechanism.

The new mechanism can provide a high static weight support in case the patient stumbles and is about to fall (center of mass too low) by using a hard mechanical limit for the arm rotation, i.e. an abutment for the downward movement of the three-cornered lever.

It is noted that the embodiment shown in the drawings relates to providing support of the body of a user. However, the elements shown in FIGS. 3 to 13 can also be used to partially support other parts of the body, e.g. a limb as an arm or a leg as such.

In this context it is clear that although the present application according to the drawings have a constant, essentially vertical force, the "suspension mechanism" can also be rotated in space in order to provide a constant force along any other direction. In this context the word "suspension mechanism" is to be understood as "constant force providing mechanism in a predetermined direction". The direction guide is not necessarily connected to a straight or circular trajectory but can be any straight or arcuate or combined direction in the three-dimensional space.

The at least one spring assembly is preferably a zero-length spring assembly.

The fourth pivotal axis of the suspension device can be mounted on a translatory adjustment guide allowing fixation of the position of the fourth pivotal axis along a predetermined straight line to adjust the weight support value provided by the device. Then the straight line can comprise an angle with the predetermined direction being chosen similar to the angle between the connecting line between the first and second pivotal axis and the connecting line between the first pivotal axis and the direction guide.

The translatory adjustment guide can comprise an adjustment plate providing the fourth pivotal axis, two adjustment carriages, two rods and four connecting elements, wherein the rods are mounted between two of the connecting elements, wherein the connecting elements are fixedly connected with the frame, wherein the rods are oriented parallel one to another, wherein the adjustment carriages are movably and lockable mounted on the rods. This allows for a well guided adjustment direction on a small room inside the housing.

Preferably, the attachment of the direction guide is a third pivotal axis. Then the attachment of the direction guide can be mounted on a translatory guide to compensate the translatory movement of the lever. It is then further advantageous to mount the translatory guide perpendicular to the direction guide.

In applications to support the body weight of a person to an extent between 20% and 80% the length of the connecting line between the first and second pivotal axis can be chosen to be shorter, especially between two and four times shorter than the connecting line between the first pivotal axis and the direction guide. Then the housing of the device remains quite small. In other embodiments where larger displacement and smaller force are required, the ratio of the lengths of the connecting lines have to be chosen even larger. In other embodiments where smaller displacement and larger force are required, a ratio of the lengths of the connecting lines may be smaller than 1 in order to achieve smaller housing.

The length of the connecting line between the first and second pivotal axis is between 50% and 400% of the length of the connecting line between the second pivotal axis and the fourth pivotal axis.

The spring assembly can comprises two saddles, wherein each saddle has two side walls and a connecting bridge, respectively, wherein the second and fourth axes are provided on the side walls. Then the associated side walls can have complementary front surfaces, adapted to touch one the other in a short-length configuration of the spring assembly.

The spring assembly can also comprise only one saddle related to one of the two axes. Then one free end of the spring assembly is mounted on or near to the other of the two axes.

The length between the bridges or the mounting part of the free ends of the spring assembly minus the distance of second axis and fourth axis is essentially equal to the actual free length of the springs of the spring assembly corrected by possible pretension of the springs.

At one saddle can be provided a base having at least one guiding rod and at the other saddle can be provided a reception wall with corresponding through holes to accommodate the guiding rod for a guided extension of the spring assembly.

The assembly can comprise an array of springs, especially of three times three springs, attached at the two opposite saddles.

Further embodiments of the invention are laid down in the dependent claims.

The mechanism according to the invention can provide a high static weight support in case the patient stumbles and is about to fall by using a hard mechanical limit for the arm rotation. The event of an impending fall is equivalent to a patient having a center of mass too low.

The mechanism according to prior art documents are full balancing weight mechanisms as shown in U.S. Pat. No. 4,883,249 A, US 2003/023195 A1, WO 2007/035096 A2 or WO 2014/098571 A1, whereas the device according to the invention provides on purpose less support for the patients, e.g. almost always <80% of the body weight, and usually 5-60% of the body weight.

The spring used can be a zero-length spring. A zero-length spring is a term for a designed spring that would exert zero force if it had zero length; if there were no constraint due to the finite wire diameter of such a helical spring, it would have zero length in the unstretched condition. The line graph of such a spring's force versus its length passes through the origin. Obviously a coil spring cannot contract to zero length because at some point the coils will touch each other and the spring will not be able to shorten any more. Zero length springs can be manufactured by using a coil spring with built-in tension. A twist can be introduced into the wire as it is coiled, in the manufacturing process. The present invention provides also the possibility to use standard springs, preferably provided in a specific assembly.

The invention provides for a very compact solution for a mechanism that puts out a vertical force that is theoretically constant with high accuracy. The solution can also be adapted to put out a force in any other predetermined direction.

The lever transmission minimizes travel inside the mechanism and optimizes space consumption. The dimensions of the mechanism are comparably small compared to the output range and force.

The output force can be continuously adjusted from min to max value without loss of constancy. The output force is also strictly proportional to the adjustment position.

The ideal spring behavior, zero length at zero force, which is required for the constant force output, is achieved directly at the points of attack of the theoretical ideal spring. No force transmission has to be used.

The system is built as passive mechanic and the only mechanical components used are ball-bearings and springs (apart from adjustment guides) reducing wear in a demanding training environment.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

Figure 1:
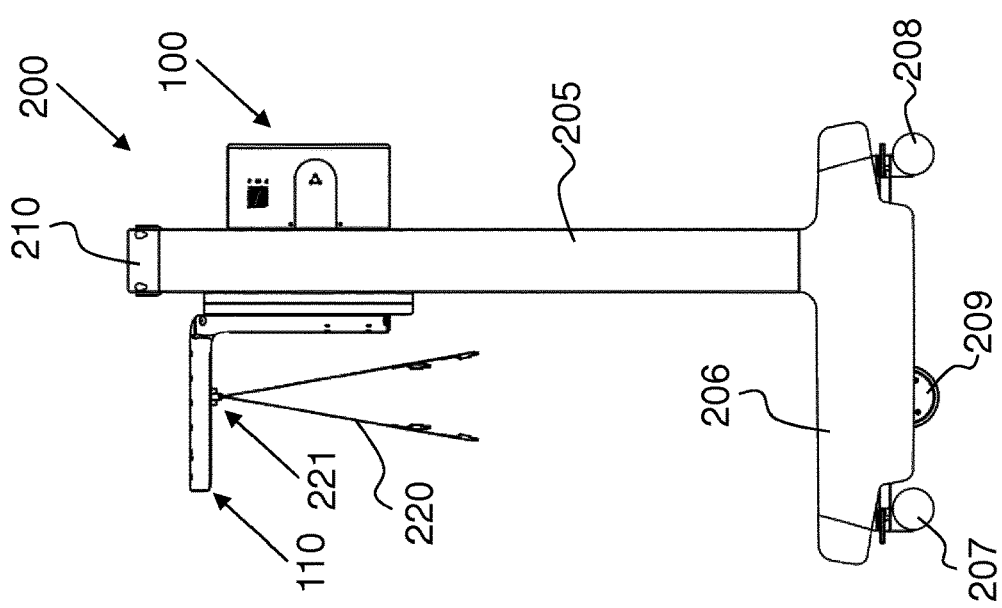
FIG. 1 shows a schematic side view of main elements of an apparatus for gait training according to an embodiment of the invention.

FIG. 1 shows a schematic side view of main elements of an apparatus 200 for gait training according to an embodiment of the invention. The apparatus 200 has a frame comprising a left column 205 and a right column (left and right in relation to the walking direction of a person using the apparatus) connected together in the upper part of the frame through a crossbeam 210 connecting the two columns in a predetermined distance one from the other creating a space for accommodating the person to be trained. Such a person is attached to the apparatus 200 by means of a harness 220.

The crossbeam 210 arrangement can be adjusted in its width through telescoping connections as shown in WO 2016/005367 A1.

The left column 205 is connected with a left base 206 and the right column is connected with a right base of the apparatus 200. Each base comprises a horizontally arranged beam in the walking direction of a patient using the apparatus. At the free ends of each beam are attached a front support wheel 207 and a back support wheel 208. They can be oriented in the direction of the beam or they can be attached to turn when the base is pivoted. The two parallel arranged bases provide a stable apparatus 200.

A drive unit is integrated in each base and are driving a left driven wheel 209 and a right driven wheel, provided on the same horizontal axis. The horizontal axis of the driven wheels is preferably located in the frontal plane of the person attached in the harness 220 of apparatus 200. In other words, the centre of gravity of the person is essentially in or near the plane mainly crossing said axis. The left column 205 and the right column are provided behind said frontal plane behind the driven wheels so that they are not in the field of vision of the person.

The weight support system 100 or weight relief mechanism is provided in the vicinity of the left column 205 and/or the right column, especially behind the column.

The weight support system 100 is attached at each beam with an L-shaped connection strut 110. The left side connection strut 110 is connected to a left strap of the harness 220 via an attachment 221. The right side connection strut is connected to a right strap of the harness via a second attachment. The attachments 221 are preferably provided with guiding rails which are provided below the strut 110. The guiding rails can also be gliding rails. The guiding rails are adapted to glide forward and backward upon any force exerted in this direction.

Figure 2:
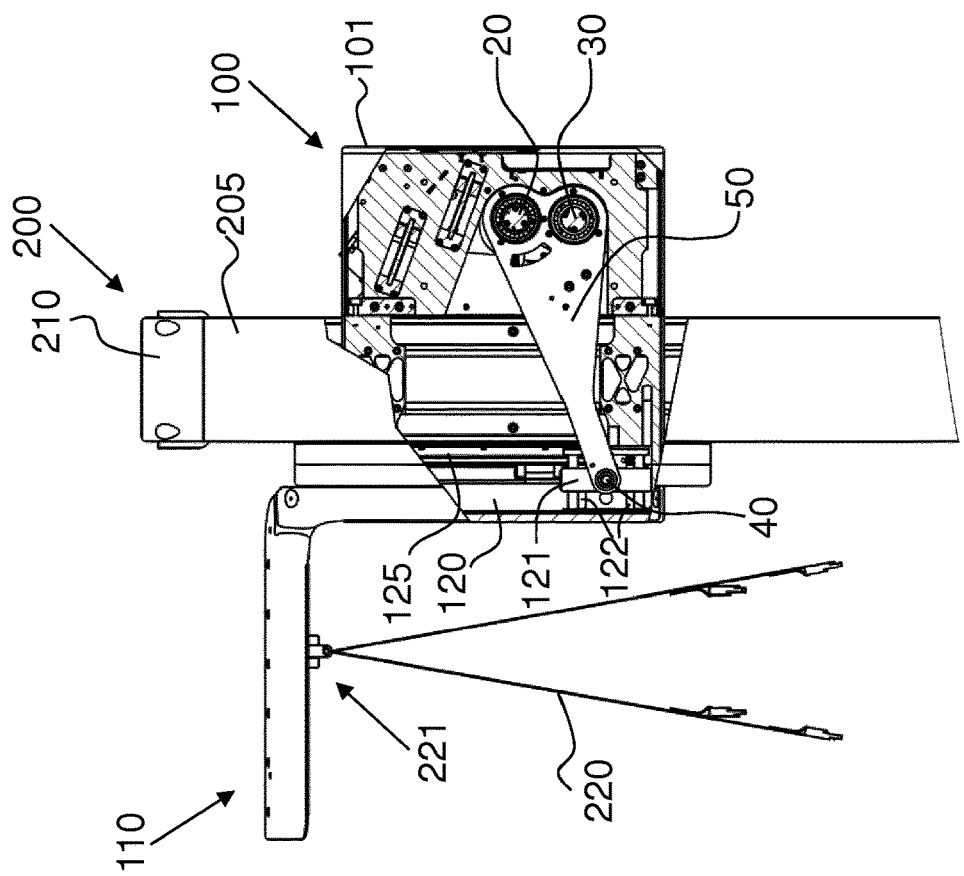
FIG. 2 shows the weight support system provided at the column of the apparatus with a partially open casing.

FIG. 2 shows the weight support system 100 provided at the column 205 of the apparatus 200 with a partially open casing 101. The system will be described in connection with the FIGS. 3pp. Here, it is noted that one main component is the three-cornered lever 50 having three pivot bearings 20, 30 and 40 at the three corners of the lever 50. The pivot bearing 20 connects the lever 50 with the housing of the weight support system 100 and as such with the associated column 205. The second pivot bearing 30 is positioned in a small distance to the first pivot bearing 20. These elements are located behind in the column 205. The third pivot bearing 40 is at the opposite end of the triangle, i.e. the triangle is an acute triangle wherein the distance between the third pivot bearing 40 and each of the other bearings 20 and 30 is far greater than the distance between the first and second bearings 20 and 30, respectively.

The third pivot bearing 40 is pivotally connected with a compensation carriage 121, in turn being attached to a sliding carriage 120, which in turn travels on vertical guiding rail 125 which in turn is attached to casing 101. The compensation carriage 121 travels horizontally along two guide rods 122, attached at the sliding carriage 120. The sliding carriage 120 is also referred to as a direction guide, while the compensation carriage 121 is also referred to as a translator guide.

Thus, the sliding carriage 120 displaces the L-shaped connection strut 110 up and down in parallel to the column 205. It is possible that a second weight support system 100 is provided at the other column of the apparatus 200 that displaces a right side connection strut 110 on the right column up and down. Alternatively both, the left side and the right side connection struts 110 are connected with a guiding sliding carriage at the columns and a single weight support system 100.

Figure 3:
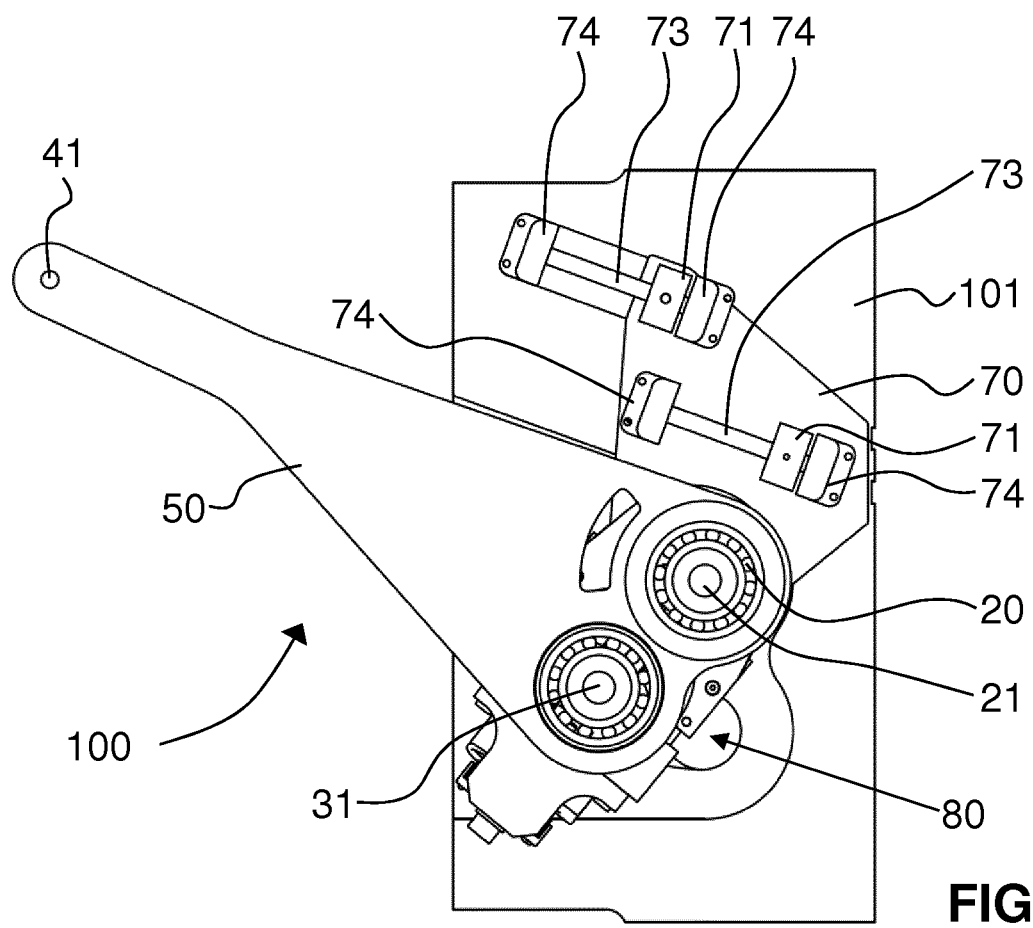
FIG. 3 shows the weight support system according to an embodiment of the invention in a first "up" position and at a first adjustment position.
Figure 4:
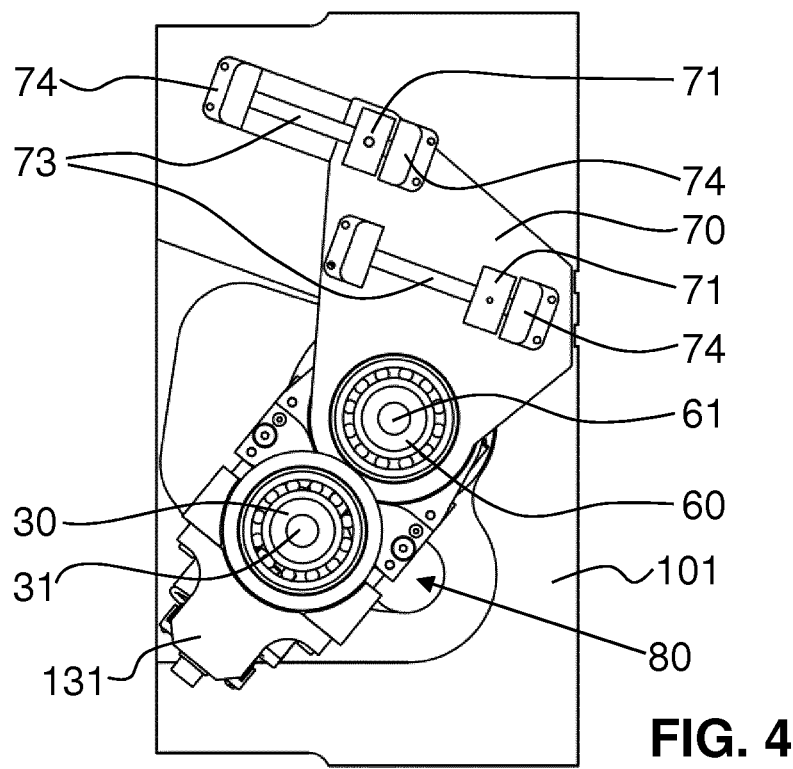
FIG. 4 shows the weight support system according to FIG. 3 without representing the three-cornered lever.
Figure 5:
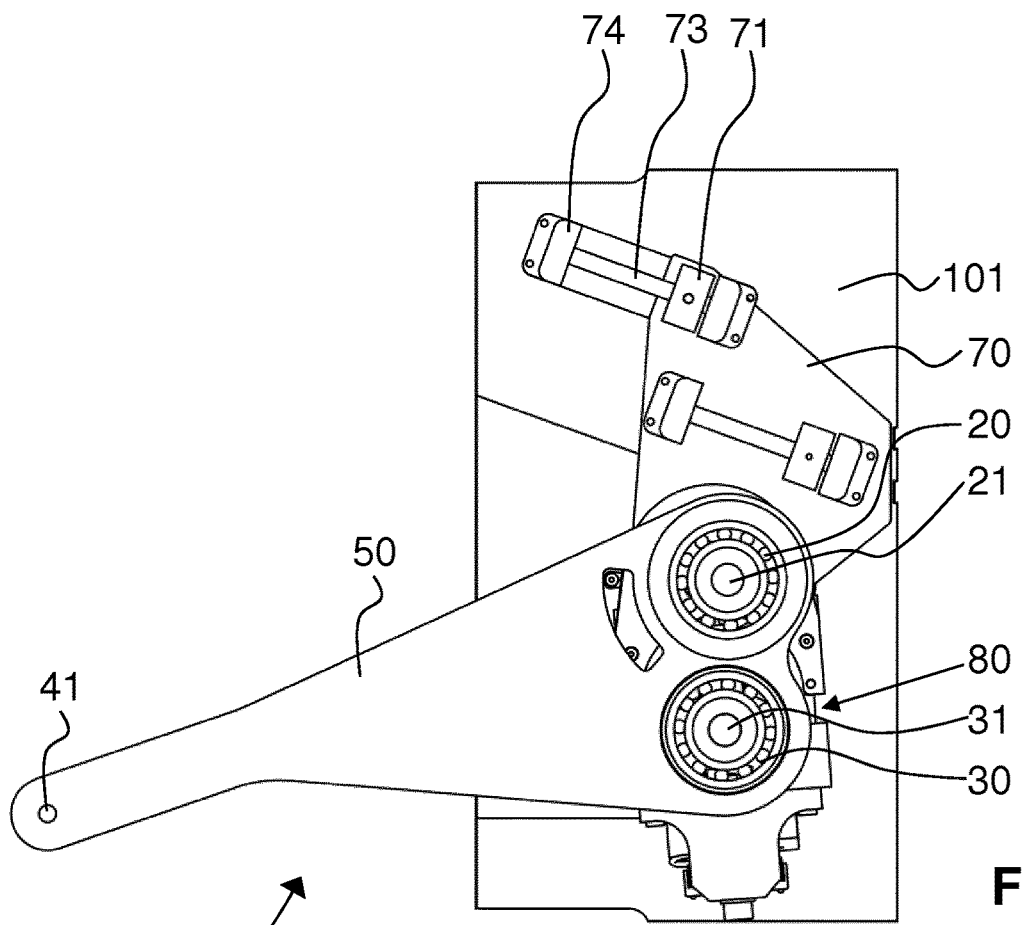
FIG. 5 shows the weight support system according to FIG. 3 in a second "down" position.
Figure 6:
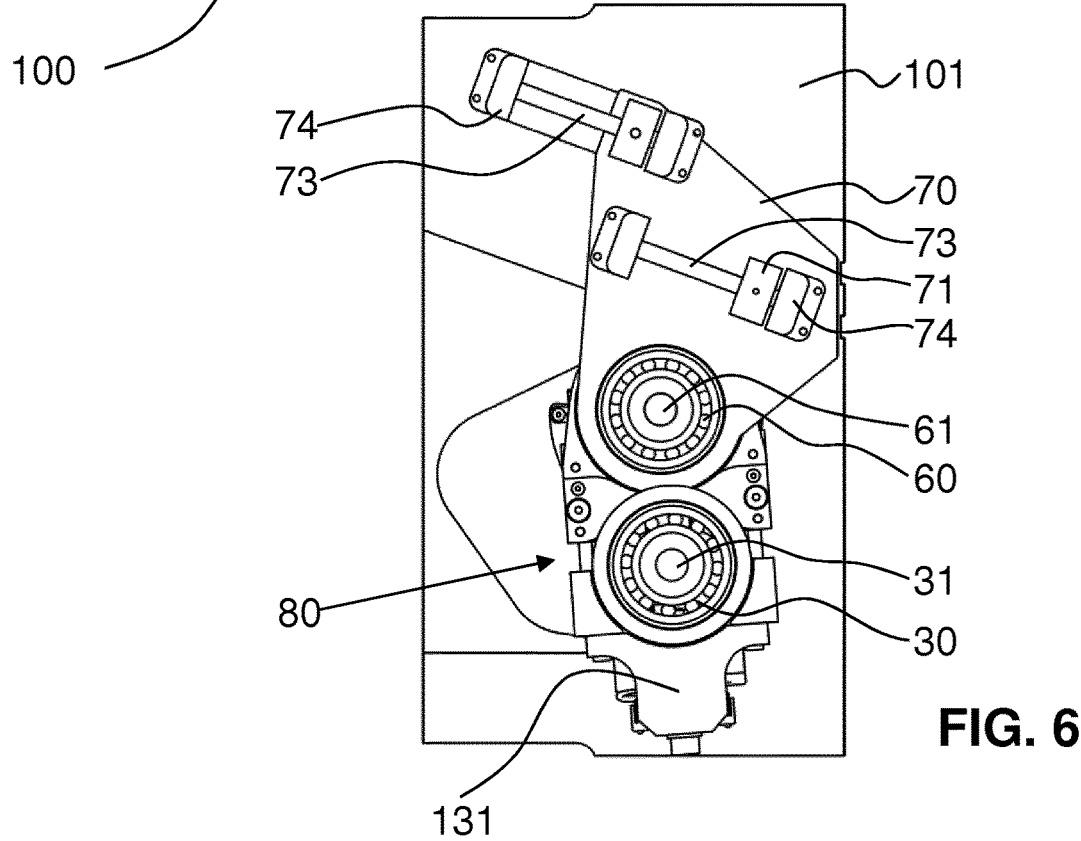
FIG. 6 shows the weight support system according to FIG. 5 without representing the three-cornered lever.

FIG. 3 shows the weight support system 100 according to an embodiment of the invention in a first "up" position and at a first adjustment position. FIG. 4 shows the weight support system 100 according to FIG. 3 in the "up" position without representing the three-cornered lever 50. FIG. 5 shows the weight support system according 100 to FIG. 3 in a second "down" position and FIG. 6 shows the weight support system 100 according to FIG. 5 without representing the three-cornered lever 50. All identical features in the drawings are using identical reference numerals. Further reference is made to FIG. 11, showing a schematical view of the connections between the elements of the weight support system 100 according to FIGS. 3 to 10. The first adjustment position is related to the minimum unloading condition of the device.

The schematical view of FIG. 11 shows the different mechanical connections applicable to the embodiments of FIGS. 3 to 10. First axis 21 is attached with casing 101 and allows a pivot movement of triangle 50 around a horizontal axis, especially one that is transversal to the movement direction of the person to be trained. The triangle 50 comprises inherently two arms 51 and 52. Short arm 51 connects the first and the second axis 21 and 31, respectively. Long arm 52 connects the first and the third axis 21 and 41, respectively. The third axis 41 is also referred to as an attachment point. Element 120 indicates that the connection strut 110, supporting the user in its harness 220, is guided vertically at the column 205. Element 121 indicates that, although the third axis 41 is not moving strictly up and down, the pivoting movement is translated into a pure up-and-down movement.

The first axis 21 is connected with the housing part not visible in FIG. 3 and FIG. 4, i.e. the housing part directed to the viewer of the drawing. The first bearing 20 enables a rotation around axis 21 and a movement of the axis 41 from the position shown in FIG. 3 to the "down" position shown in FIG. 5. At the same time the axis 31 is also rotated counter-clockwise via the second bearing 30.

FIG. 4 shows the fourth axis 61 and the related fourth bearing 60 which is connected with the second bearing 30 via a zero length spring assembly 80. The zero-length assembly 80 is explained in connection with FIGS. 12pp. The fourth axis 61 is also referred to as a translator adjustment pivotal axis.

The fourth axis 61 is connected with trapezoidal adjustment plate 70. The adjustment plate 70 maintains fourth axis 61 in the defined position and fixes the rotation point of bearing 61. The adjustment plate 70 is fixedly connected with two adjustment carriages 71 mounted on the plate 70. The carriages 71 can be moved along a translatory axis 72 shown in FIG. 11. The axis 72 is realized by rods 73 mounted in connecting elements 74 which are attached at the casing 101, here at the casing part directed towards the viewer of the drawings. The axis 72 is parallel to rods 73 and passes through axes 21 and 61.

The position of the adjustment carriages 71 define and determine the adjustment position of the device, here in view of FIG. 3 to FIG. 6 the first adjustment position related to the minimum weight reduction. The position of the two adjustment carriages 71 is fixed for the intended movement of triangle 50 as shown with the extremum positions in FIG. 3 and FIG. 5. It can be seen that the adjustment 70 is positioned at the right edge of the casing 101.

Referring again to FIG. 11, it is noted that the angle alpha between the connecting line 52 between the first 21 and third 41 axis and the connecting line 51 between the first 21 and third 31 axis is about the same as is the angle between the translatory axis 72 defined by the orientation of the rods 73 and the vertical or plumb line as defined by the column 205. The reference numeral 80' indicates the spring connection between the second 31 and fourth 61 axis.

FIG. 5 shows the weight support system according 100 in the most downward position and FIG. 6 shows the embodiment of FIG. 5 without representing the three-cornered lever 50. In the minimum weight reduction shown here, the position of the first axis 21 is very similar to the position of the fourth axis 61. They are of course parallel one to the other but they are here almost aligned. Relating to FIG. 11, this is related to the point 61 indicating the fourth axis being very near to the point 21 indicating the first axis, or in other word the connection 51 and the main direction 80' of the spring assembly are almost parallel one to the other.

Figure 7:
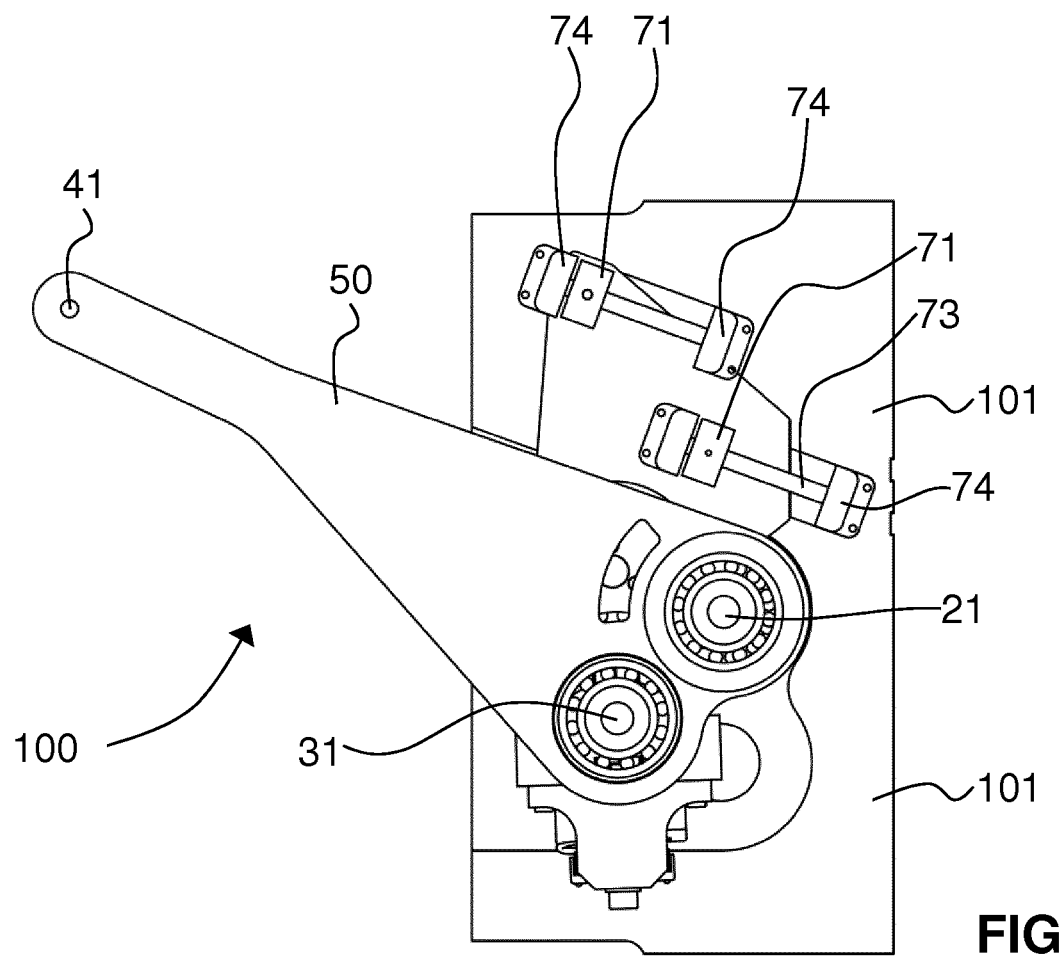
FIG. 7 shows the weight support system according to FIG. 3 in the first "up" position but at a second, different adjustment position.
Figure 8:
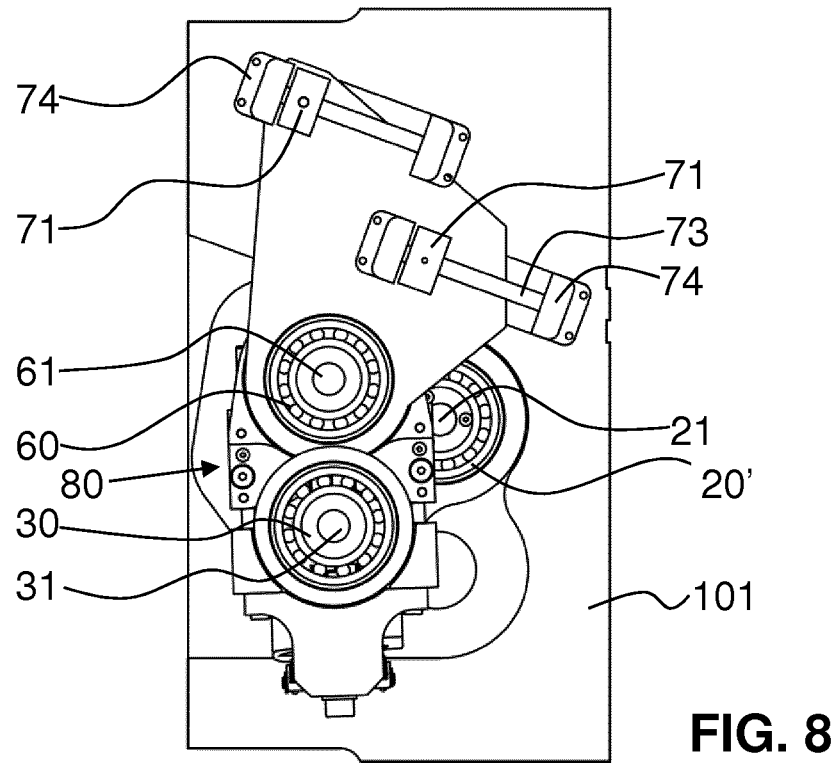
FIG. 8 shows the weight support system according to FIG. 7 without representing the three-cornered lever.

FIG. 7 shows the weight support system 100 according to the embodiment of FIG. 3 in a first "up" position but at a second adjustment position related to the maximum weight reduction possible in connection with this embodiment. FIG. 8 shows the weight support system 100 according to FIG. 7 in the "up" position without representing the three-cornered lever 50.

Figure 9:
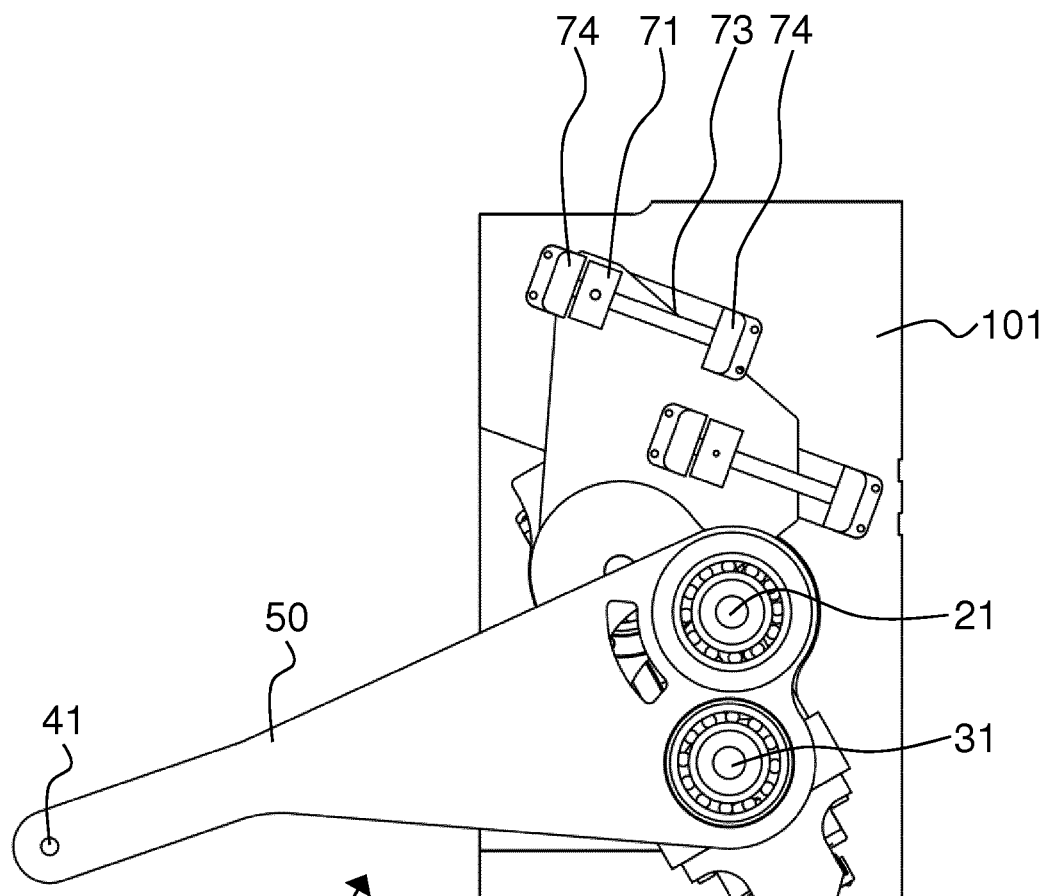
FIG. 9 shows the weight support system according to FIG. 7 in a second "down" position.
Figure 10:
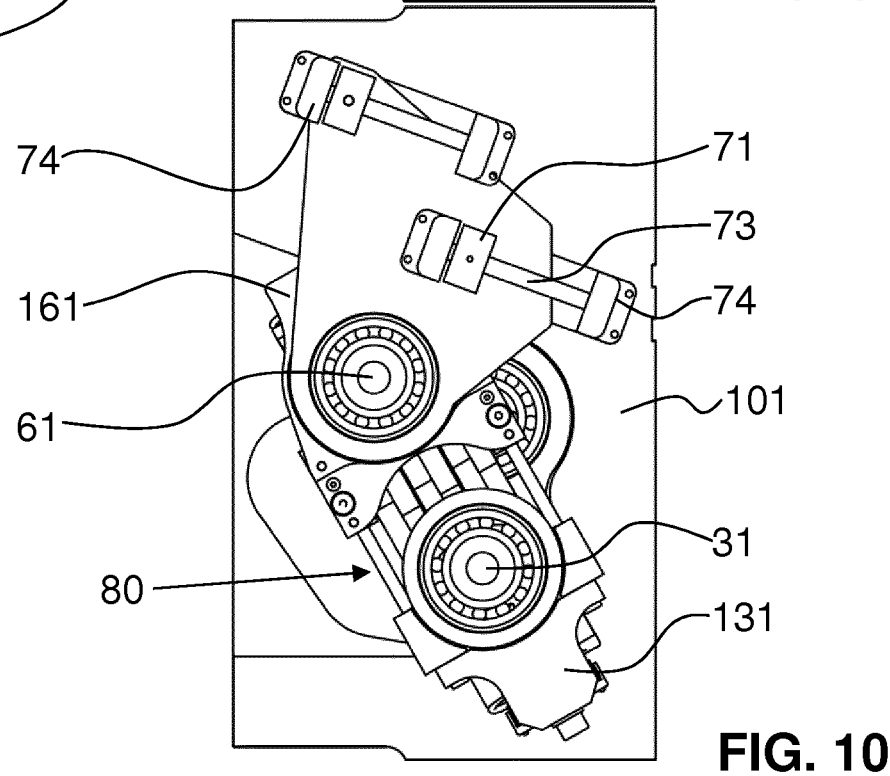
FIG. 10 shows the weight support system according to FIG. 9 without representing the three-cornered lever.
Figure 11:
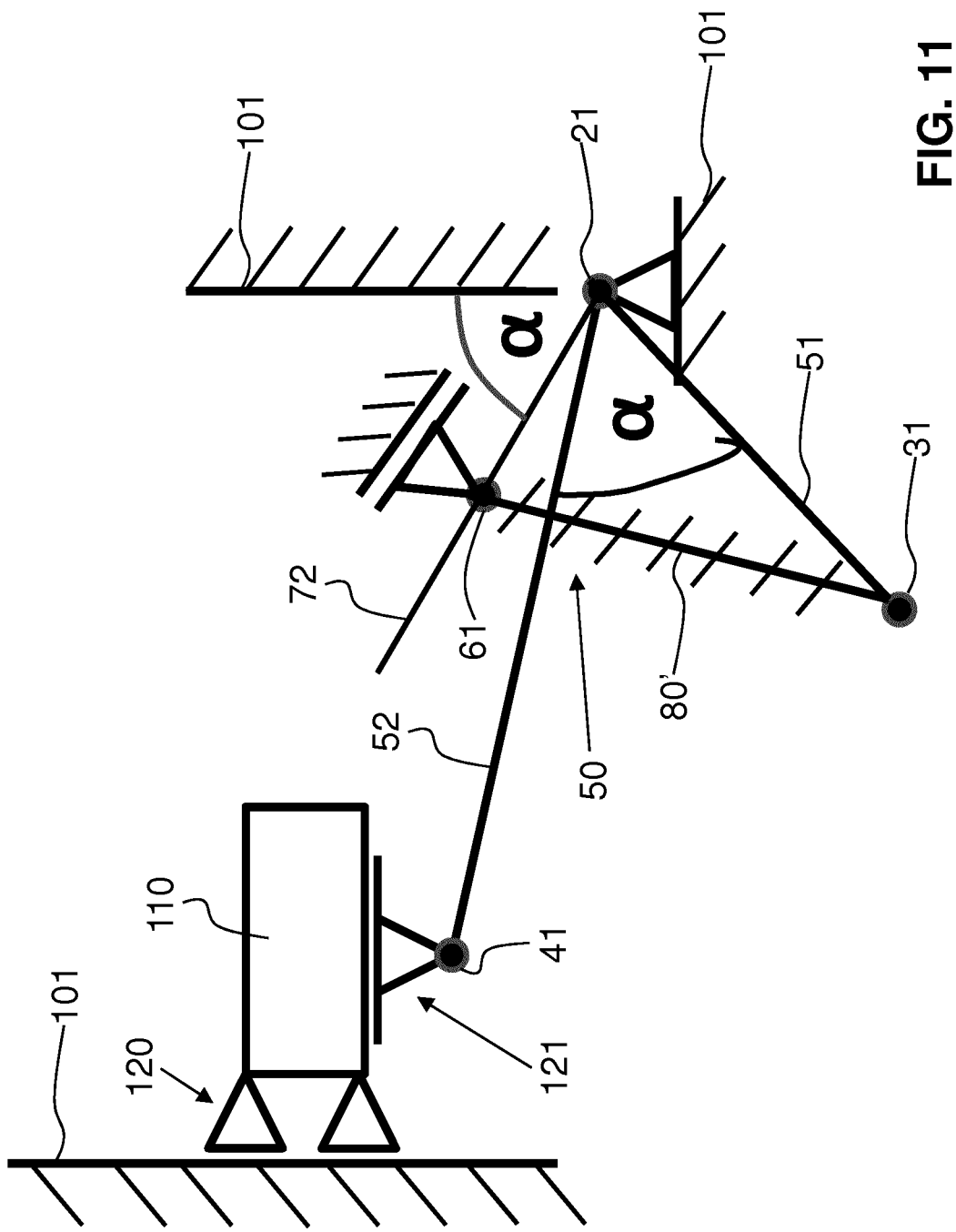
FIG. 11 shows a schematical view of the connections between the elements of the weight support system according to FIGS. 3 to 10.

FIG. 9 shows the weight support system 100 according to FIG. 7 in a second "down" position and FIG. 10 shows the weight support system 100 according to FIG. 9 without representing the three-cornered lever 50. All identical features in the drawings are using identical reference numerals.

The position of the first axis 21 and the second axis 31 and the third axis 41 are identical in FIG. 3 and FIG. 7 since this position is determined by the attachment of axis 21 with the casing 101. The difference in the adjustment position is visible related to FIGS. 8 and 10.

FIG. 8 shows the fourth axis 61 and the related fourth bearing 60 which is connected with the second bearing 30 via spring assembly 80. The assembly 80 is explained in connection with FIGS. 12pp.

The adjustment plate 70 maintaining fourth axis 61 in the defined position is in a different translatory position compared to FIGS. 3 to 6, since the two adjustment carriages 71 mounted on the plate 70 were moved along the translatory axis 72 in an abutment position against the connecting elements 74 which are attached at the casing 101.

Whereas the position of the adjustment carriages 71 in FIG. 3 was abutting against the right connecting element, they abut here on the left side of the rods 73. This second adjustment position is related to the maximum weight reduction. Of course it is preferred that the carriages 71 can be displaced to any point on the rods 73 and fixed at any intermediate position. The position of the two adjustment carriages 71 brings the adjustment plate 70 to the left along axis 72 with respect to first axis 21. Collectively, elements 70-74 define the translator adjustment guide.

The difference between the FIGS. 3 to 6 and FIGS. 7 to 10 is connected to the different position of the fourth axis 61 which is here no longer similar and in line with the first axis 21 but almost "above" the second axis 31 expanding the spring assembly since the orientation of the rods 73 is inclined in the direction of the connection between first 21 and third 41 axis.

Reference numeral 21 marks the first axis and 20' marks an additional first bearing on the first axis 21 which may be used to increase mechanical stability.

FIG. 9 shows the weight support system according 100 in the most downward position and FIG. 10 shows the embodiment of FIG. 9 without representing the three-cornered lever 50. In the maximum weight reduction shown here, the position of the fourth axis 61 is displaced relatively to the position of the first axis 21.

Figure 12:
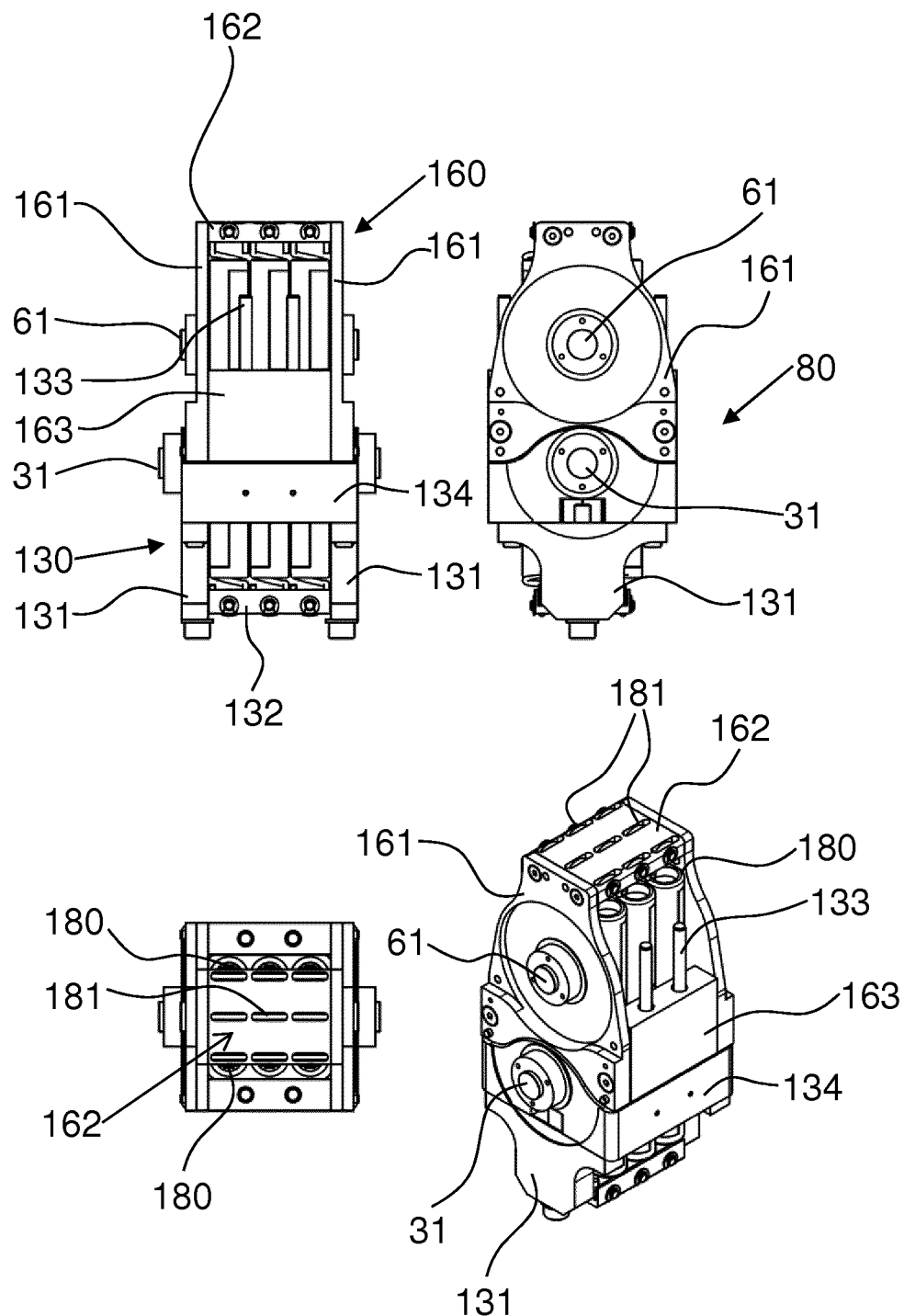
FIG. 12 shows a view of a zero-length spring assembly according to an embodiment with a minimum extension.
Figure 13:
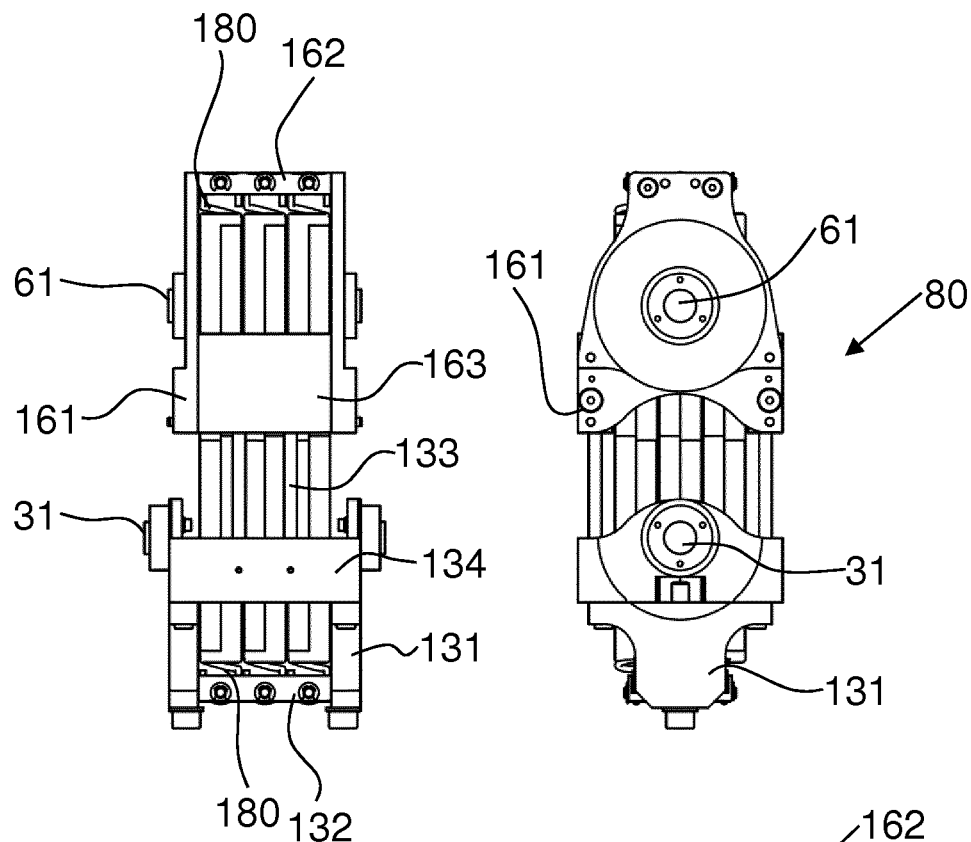
FIG. 13 shows the assembly according to FIG. 12 with a maximum extension.
Figure 13:
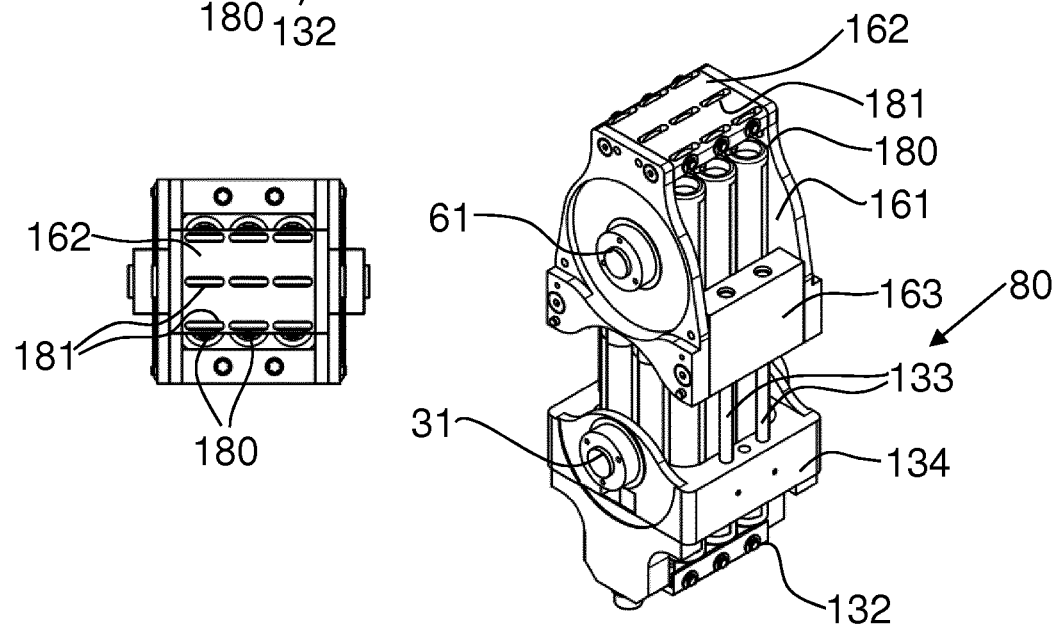

FIG. 12 shows a view of the zero-length spring assembly 80 according to an embodiment with a minimum extension, and FIG. 13 shows said assembly 80 according to FIG. 12 with a maximum extension. The spring assembly 80 connects fourth axis 61 and the related fourth bearing 60 with the second axis 31 and the related second bearing 30.

The zero-length spring assembly 80 comprises two saddles 130 and 160. Each saddle 130, 160 has two side walls 131, 161 and a connecting bridge 132, 162, respectively. The associated side walls 131, 161 have complementary front surfaces, touching one the other in the short-length configuration of the spring assembly 80 of FIG. 12. Between the side walls 131 a base block 134 is providing a base having two guiding rods 133 and the associated side walls 161 comprise a reception wall 163 with corresponding through holes to accommodate the guiding rods 133 so that the extension is guided and happens along a predefined connecting line 80' as shown in FIG. 11.

Nine spring packages 180 are provided in a 3×3 array and attached at opposite parts of the bridges 132 and 162, respectively, via connection elements 181. The connection element 181 can be one of the typical ends for extension springs as a hook or full or half loop. Each spring 180 is an extension spring with a specific spring rate and specific pretensioned state at the closed condition as seen in FIG. 12.

The length between the bridges 132 and 162 minus the distance of second axis 31 and fourth axis 61 has to be equal to the actual free length of springs 180 corrected by possible pretension of the springs 180.

LIST OF REFERENCE SIGNS

| | |
|---|---|
| 20 | first bearing |
| 20' | additional first bearing |
| 21 | first axis |
| 30 | second bearing |
| 31 | second axis |
| 40 | third bearing |
| 41 | third axis |
| 50 | three-cornered lever |
| 51 | short arm |
| 52 | long arm |
| 60 | fourth bearing |
| 61 | fourth axis |
| 70 | adjustment plate |
| 71 | adjustment carriages |
| 72 | translatory axis |
| 73 | rod |
| 74 | connecting element |
| 80 | zero-length spring assembly |
| 80' | spring connection |
| 100 | weight support system |
| 101 | casing (frame) |
| 110 | connection strut |
| 120 | sliding carriage |
| 121 | compensation carriage |
| 122 | guide rod |
| 125 | vertical guiding rail |
| 130 | saddle |
| 131 | side wall |
| 132 | bridge |
| 133 | guiding rod |
| 134 | base block |
| 160 | saddle |
| 161 | side wall |
| 162 | bridge |
| 163 | reception wall |
| 180 | spring package/tension spring |
| 181 | connection element |
| 200 | apparatus |
| 205 | left column |
| 206 | left base |
| 207 | front wheel |
| 208 | back wheel |
| 209 | driven wheel |
| 210 | crossbeam |
| 220 | harness |
| 221 | attachment |

The invention claimed is:

1. A suspension device for balancing a weight, comprising:
   a casing supporting a first pivotal axis and a casing connecting pivotal axis,
   a direction guide for a supportive movement of the weight, having an attachment point,
   a lever being connected with the casing at the first pivotal axis, and
   at least one spring assembly;
   wherein the lever comprises a second pivotal axis being positioned at a distance from a connection line between the first pivotal axis and the attachment point of the direction guide,
   wherein the at least one spring assembly is connecting the lever with the casing and is pivotally attached between the second pivotal axis and the casing connecting pivotal axis,
   wherein the lever has a pivotal connection between the attachment point of the direction guide and the casing around the first pivotal axis,
   wherein the at least one spring assembly is a zero-length spring, and
   wherein the suspension device is configured to allow a patient or a limb of a patient to be at least partially supported in a predetermined direction.

2. The suspension device according to claim 1, wherein a translatory adjustment guide is provided at the casing and comprises a translatory adjustment pivotal axis being mounted on the translatory adjustment guide allowing fixation of the position of the translatory adjustment pivotal axis along a predetermined straight line to adjust a weight support value.

3. The suspension device according to claim 2, wherein the translatory adjustment guide comprises an adjustment plate providing a fourth pivotal axis, two adjustment carriages, two rods and four connecting elements, wherein the rods are mounted between two of the connecting elements, wherein the connecting elements are fixedly connected with the casing, wherein the rods are oriented parallel one to another, wherein the adjustment carriages are movably and lockable mounted on the rods.

4. The suspension device according to claim 3, wherein a length of a spring assembly connecting line between the first and second pivotal axis is between 50% and 400% of the length of a translatory guide connecting line between the second pivotal axis and the translatory adjustment pivotal axis.

5. The suspension device according to claim 2, wherein the straight line comprises an angle with the predetermined direction being chosen similar to the angle between the spring assembly connecting line between the first and second pivotal axis and the connection line between the first pivotal axis and the attachment point of the direction guide.

6. The suspension device according to claim 2, wherein a length of a spring assembly connecting line between the first and second pivotal axis is between two and four times shorter than the connection line between the first pivotal axis and the attachment point of the direction guide.

7. The suspension device according to claim 1, wherein the attachment point of the direction guide is a third pivotal axis.

8. The suspension device according to claim 7, wherein the attachment point of the direction guide is mounted on a translatory guide to compensate the translatory movement of the lever.

9. The suspension device according to claim 8, wherein the translatory guide is mounted perpendicular to the direction guide.

10. The suspension device according to claim 1, wherein the spring assembly comprises at least one saddle, wherein the at least one saddle has two side walls respectively connected by a connecting bridge, wherein at least one of the second pivotal axis and a translatory adjustment pivotal axis are provided on the side walls, wherein one free end of the spring assembly is mounted on or near the first pivotal axis and a third pivotal axis corresponding to the attachment point.

11. The suspension device according to claim 10, wherein a length between the bridges minus a distance of second pivotal axis and the translatory adjustment pivotal axis is essentially equal to the actual free length of the spring of the spring assembly corrected by pretension the springs.

12. The suspension device according to claim 10, wherein the side walls of each of the two saddles have complementary front surfaces, adapted to touch one another in a short-length configuration of the spring assembly.

13. The suspension device according to claim 10, wherein the at least one saddle comprises two saddles, wherein one saddle is provided with a base block having at least one guiding rod and wherein the other saddle is provided with a reception wall with corresponding through holes to accommodate the at least one guiding rod for a guided extension of the spring assembly.

14. The suspension device according to claim 1, wherein the angle between a spring assembly connecting line between the first and second pivotal axis and the connection line between the first pivotal axis and the attachment point of the direction guide is between 50° and 80°.

15. The suspension device according to claim 14, wherein the angle between the first and second pivotal axis and the connection line between the first pivotal axis and the direction guide is between 60° and 75° or between 65° and 73°.

16. The suspension device according to claim 1, wherein the spring assembly comprises an array of springs.

17. The suspension device according to claim 16, wherein the array of springs comprises three times three the springs attached at two opposite saddles of the spring assembly.

\* \* \* \* \*